Jan. 11, 1927.
D. M. SIMONS
1,613,910
TERMINAL BUILDING FOR OIL FILLED CABLES
Filed Oct. 1, 1925
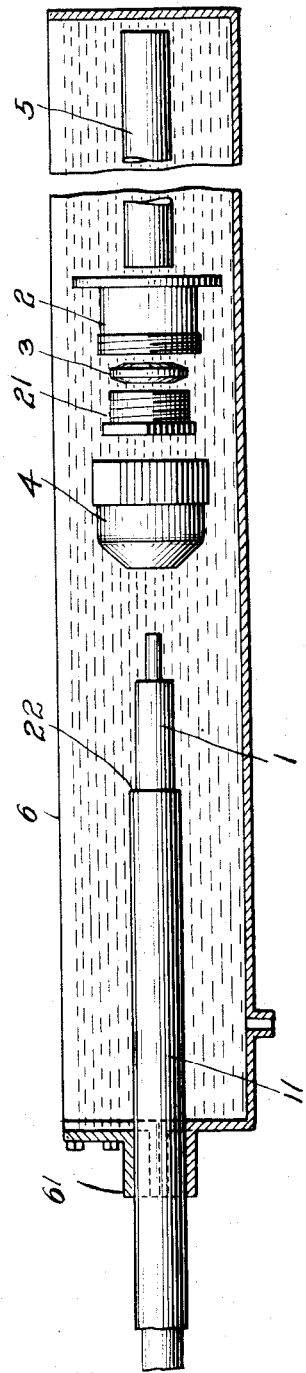
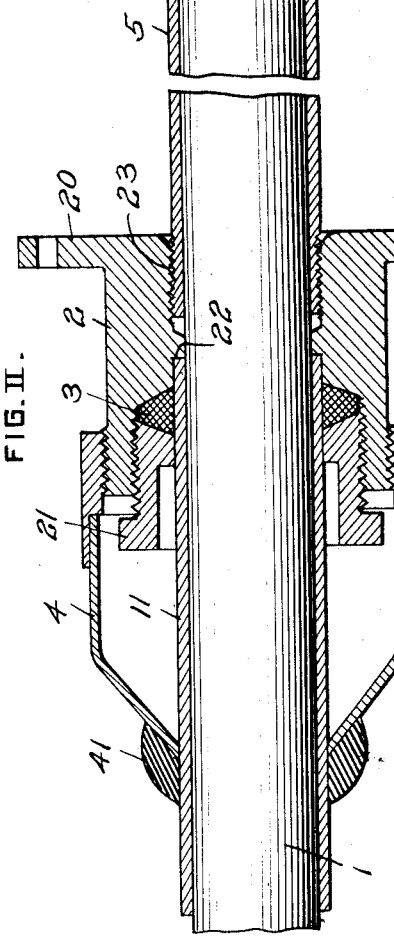
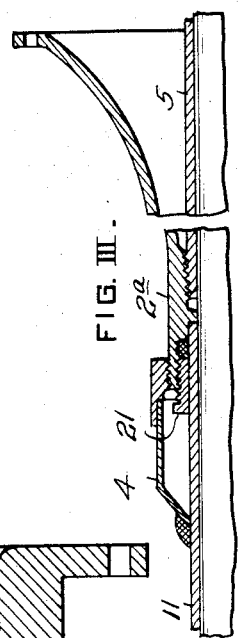
WITNESSES
INVENTOR
Donald M. Simons
by Christy and Christy
his attorneys Patented Jan. 11, 1927.

1,613,910

UNITED STATES PATENT OFFICE.

DONALD M. SIMONS, OF OSBORNE, PENNSYLVANIA, ASSIGNOR TO STANDARD UNDERGROUND CABLE COMPANY, OF PITTSBURGH, PENNSYLVANIA, A CORPORATION OF PENNSYLVANIA.

TERMINAL BUILDING FOR OIL-FILLED CABLES.

Application filed October 1, 1925. Serial No. 59,843.

My invention relates to oil-filled cables and specifically to terminal building for oil-filled cables, and consists both in method and in structure.

An oil-filled cable is one whose insulation consists of or contains material which at the temperature of installation is fluid. This fluid material may be present in the cable structure as a free body or layer of insulation, or it may be present in association with other insulation; for instance, it may be more or less completely absorbed by a body of porous or fibrous insulation. In the building of cables for particular kinds and conditions of service, it is in some cases desirable, for electrical reasons, to use insulating compound which even at ordinary temperatures is liquid; or, again, a given cable, containing a compound which at ordinary atmospheric temperature would not flow, may be installed in a hot country or in a hot location, and at a temperature at which the compound would flow. I cite as an instance of an oil-filled cable, but only as an instance, and not by way of limitation, the cable shown and described in the application of Henry W. Fisher for Letters Patent of the United States, filed February 5, 1925, Serial No. 6925.

In making insulation of an oil-filled cable it is necessary that there be no escape of the insulating compound, whether it be present as a free body of oil, or as a body more or less completely absorbed in a body of porous or fibrous insulation. And, specifically, in making connection of an oil-filled cable to a terminal casing there should be no running away of the fluid insulation, when the outer covering of the cable is removed.

In the accompanying drawings Fig. I is a view in vertical section (somewhat diagrammatic in the details shown) of a certain tank employed in the practice of my invention. Within the tank a cable end and associated parts appear in elevation. Fig. II is a view to larger scale, showing in axial section a cable body and certain fittings and appliances in place upon it. Fig. III is a fragmentary view to smaller scale corresponding to Fig. II and illustrating a modification in detail of structure.

Referring, first, to Fig. II, a cable body is indicated at 1. 2 is an anchoring ring, surrounding the cable body. It is provided with a flange 20, by means of which fluid-tight mechanical union may be effected with the wall of a terminal casing, around the margin of an orifice through which the cable has ingress. According to Fig. II union is intended to be made immediately to a bell, which bell in turn is united to the terminal casing; according to Fig. III the ring 2ª itself becomes the bell, and is intended to be united immediately to the terminal casing. In either case, the anchoring ring is provided with a telescopically movable gland ring 21, by means of which a gasket 3 of suitable material (lead wool, for instance) may be compressed between suitably disposed surfaces exteriorly upon the cable sheath, to effect a liquid tight union. The particular means here shown for securing gland ring to anchoring ring and for advancing the gland ring to effect gasket compression, consist in the screw-thread engagement between anchoring ring and gland ring. And the screw thread is preferably formed as shown, in the interior of a bore formed in the anchoring ring.

The anchoring ring is screw-threaded externally also, and by such provision a thimble 4 is adapted to be advanced upon and united with the anchoring ring. The thimble 4 will ultimately at its opposite end be secured to the cable sheath, as by a wiped solder joint, indicated at 41, and the space within the thimble may, when assembly is otherwise complete, be filled with liquid insulation. These details are known to the art.

The more minute structure of the anchoring ring is found in these features; the bore within the ring is stepped, as at 22, and so is adapted to abut upon the cut-away end of the cable sheath 11. Beyond the step 22—that is, to the right, Fig. II,—the bore within the anchoring ring is enlarged again, as indicated at 23. The surface within this enlarged portion of the bore may be screw-threaded or not, as particular instrumentalities about to be described may require.

5 is a long tubular cap adapted to be applied upon the end of the cable which is to be introduced through the wall of the terminal casing, and at its free edge it is adapted to enter the enlarged bore 23 of anchoring ring 2 and to be secured there in fluid-tight engagement. This tubular cap may be made of metal, and if made of metal it may at its free end be screw-threaded exteriorly, and so may be secured in fluid-tight seating in the bore 23, screw-threaded to receive it. It may be made of other material,—fibre, for instance,—and may be screw-threaded or compressed to place, but in any case making fluid-tight union with the anchoring ring 2.

Turning now to Fig. I, a trough 6 of suitable length is provided. In one end of this trough an orifice is formed and an attachment 61 is provided, adapted to effect liquid tight closure of the orifice upon a cable body 1 introduced through the orifice. This closure-affording attachment may be of any particular construction which may be found convenient, and no detailed description of any particular form is required. And the structure is such as to provide for the release and removal of the prepared cable-end.

The cable during laying is sealed at the end, to prevent escape of the liquid insulation within, and it is a sealed cable-end with which the operation of my invention begins. According to my procedure the sealed cable-end is introduced through the orifice and caused to extend for a suitable distance within the trough, and the attachment 61 is then caused to effect fluid-tight closure of the orifice around the cable body. The trough then is filled with liquid insulation, which may be and ordinarily will be oil of the same character as that which fills the cable insulation.

The lead sheath and the insulation are then for the desired distances cut away and removed from the submerged cable-end. It will be understood that, before introduction of the cable-end into the trough, the lead sheath may have been scored, and partially cut through, both circumferentially and longitudinally, to indicate the place where cutting is to be made, and also to make easy the ultimate cutting under oil. If the cable-end be so initially scored longitudinally, the longitudinal scoring will naturally be uppermost, in the placing of the cable within the trough.

When the cable-end has so been prepared under oil the several parts now to be individually enumerated are applied. They ordinarily will be submerged in the trough after the cutting away and removal of sheath and insulation have been accomplished. First the thimble 4 is slipped over the cable-end and is run along the length of the cable-end from right to left, Fig. I, and then following it the gland ring 21 and if the packing 3 be a formed annulus, the packing in like manner. The anchoring ring 2 is then applied and brought to its ultimate position, with the step 22 in abutment upon the square-cut end of the cable sheath. Then, while the structure remains submerged, the gland ring 21 is advanced from left to right, and the ultimate and permanent union of the anchoring ring 2 upon the cable sheath is effected.

When this has been done, the cap 5 is applied, and its free edge seated in the enlarged portion 23 of the bore of anchoring ring 2. When this has been done the cable-end is removed from the trough. (The oil may of course be drained away, and then the cable may be released.) Then the thimble 4 is screwed to place on the anchoring ring 2 and when so placed is at its free end united, as by a wiped solder joint 41, to the cable sheath; the space within the thimble is then filled with liquid insulation and the filling hole is sealed. The cable-end capped with the cap 5 is introduced through its orifice in the terminal casing formed to receive it, and union of the anchoring ring 2 to the casing wall is effected. The sequence of the steps of securing the thimble 4 and of applying and securing the whole in the terminal casing may be reversed, if in any case that be desired.

When the cable-end has so been secured in the terminal casing and the casing has been filled with oil, the cap 5 may be removed. If, as ordinarily will be the case, the cable end enters the terminal casing vertically from beneath, the filling of the casing with oil before removal of cap 5 is not necessary. If the cap be of metal it may in removal merely be unscrewed; or it may be cut away sufficiently. If it be of fibre or of any suitable insulating material, it may suffice merely to remove it in part. The exposed conductor end is then accessible for union with an aerial, union is made and the terminal casing is closed and filled in usual manner.

I claim as my invention:

1. The method herein described of dealing with an oil-filled cable, which consists in opening the end of the cable under oil, applying to the opened cable end, while still under oil, a closure, and removing from the oil the closed cable end.

2. The method herein described of introducing an oil-filled cable into a terminal casing which consists in opening the sealed end of an oil-filled cable under liquid insulation, applying to the submerged and opened cable-end an anchorage fitting and capping the cable-end again, removing the so recapped cable-end from the submerging liquid and anchoring it in place in a terminal casing.

3. The method herein described of making installation of an oil-filled cable which consists in cutting away under liquid insulation the sheath adjacent the end of an oil-filled cable, applying to the end of the sheath of the submerged and opened cable end an anchorage structure with a removable cap enclosing the cable end, removing the capped cable end from sugmergence and anchoring it by the said anchorage structure in vertical position in a terminal casing, removing the cap, and making electrical union within the casing of the exposed cable conductor with a lead-out.

4. The method herein described of making installation of an oil-filled cable which consists in cutting away under liquid insulation the sheath adjacent the end of an oil-filled cable, applying in fluid-tight engagement upon the end of the sheath of the submerged and opened cable end an anchorage ring carrying on on side a thimble surrounding the sheathed cable body and on the other side a removable cable-end covering cap, removing the so prepared assembly from submergence and uniting said thimble to the cable sheath, introducing the cable end in vertical position in a terminal casing and anchoring it in place by said anchorage ring, and removing the cap within the terminal casing.

5. In a terminal structure for an oil-filled cable the combination of an anchoring ring provided internally with a shoulder, means for securing said ring in liquid-tight engagement upon the sheath of the cable with said shoulder in abutment upon the cut-away end of the sheath of such cable, and a cap for a cable-end adapted to be secured at its otherwise free edge to said anchoring ring.

6. In a terminal structure for an oil-filled cable the combination of an anchoring ring provided internally with a shoulder, means for securing said ring in liquid-tight engagement upon the sheath of the cable with said shoulder in abutment upon the cut-away end of the sheath of such cable, and a cap for a cable-end removably secured to said ring.

7. In a terminal structure for an oil-filled cable the combination of an anchoring ring provided internally with a shoulder, means for securing said ring in liquid-tight engagement upon the sheath of a cable with said shoulder in abutment upon the cut-away end of the sheath of such cable, a thimble adapted to be secured to the said ring when applied and when so secured adapted to surround the cable sheath adjacent the end, and a cap for the cable end adapted to be secured at its otherwise free edge to said anchoring ring.

In testimony whereof I have hereunto set my hand.

DONALD M. SIMONS.